April 26, 1955
C. H. BEARE ET AL
2,707,017
METHOD OF MAKING WIRE REINFORCED FLEXIBLE HOSE
Filed March 3, 1951
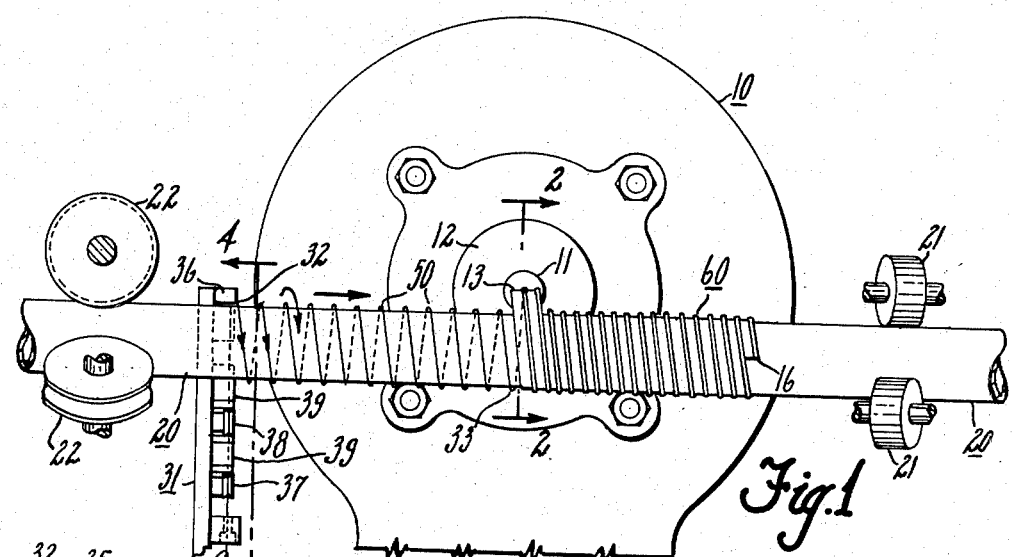
INVENTORS
CHARLES H. BEARE
STANLEY R. CARSON
RUSSEL L. MONBECK
BY Willits Hardman & Tehr
THEIR ATTORNEYS

United States Patent Office 2,707,017
Patented Apr. 26, 1955

2,707,017

METHOD OF MAKING WIRE REINFORCED FLEXIBLE HOSE

Charles H. Beare, Stanley R. Carson, and Russel L. Monbeck, Dayton, Ohio, assignors to General Motors Corporation, Detroit, Mich., a corporation of Delaware Application March 3, 1951, Serial No. 213,704

3 Claims. (Cl. 154—8)

This invention relates to a method and apparatus for making spirally-wrapped flexible tubing having a spiral wire reinforcement therein, especially flexible air hose such as is now commonly used as air ducts in automobiles, vacuum cleaners, etc.

A primary object of the invention is to provide a continuous highly economical method and apparatus for making such flexible hose or tubing by extruding a tape from a plastic compound of rubber or rubber-like material, imbedding the reinforcing wire within the tape section as it passes thru the extrusion aperture to form a wire-reinforced tape, and immediately wrapping the emerging tape into helical form to form a hose structure, then subsequently curing and integrating the wrapped hose structure.

Heretofore attempts to use a wire-reinforced tape which has been extruded from a rubber or similar plastic compound in making such a helically wrapped hose have been found impractical due to the reinforcing wire having a great tendency to cut thru the relatively soft extruded tape or otherwise becoming dislocated in the tape section. Now a very important feature of the method of this invention is the coiling and setting of a springy wire into circular shape prior to leading said wire thru the extrusion aperture. The length of the coiled wire is progressively sprung outwardly from its coiled shape sufficiently to guide and lead the wire lengthwise thru the extrusion aperture without so distorting the wire as to destroy its inherent tendency to spring back into circular shape after it has passed thru said aperture and imbedded in the extruded tape. Thus the wire-reinforced tape emerging from the extrusion aperture can be very readily coiled into helical form without cutting into the relatively soft tape material since the wire inherently springs back into circular shape due to its prior coiling.

Another feature of this invention is axially passing the rotating mandrel upon which the wire-reinforced tape is helically wrapped closely adjacent the extrusion aperture at approximate right angles to the direction of travel of the emerging extruded tape. The helically coiled bare wire loosely surrounds this axially moving rotating mandrel but is not driven thereby as said wire passes to the extrusion aperture. Thus the wire is fed loosely to the extrusion aperture and is carried thru said aperture by the extruded material itself so that both the wire and the extruded tape have exactly the same speed of travel thru said aperture.

Another feature is the original coiling of the bare wire directly around but loosely upon the axially moving mandrel. Thus the mandrel is arranged to loosely guide the bare wire helix to the point where it is sprung radially outwardly and pulled thru the stationary guide leading to the extrusion aperture. By this means the bare wire is properly guided by the mandrel but the mandrel does not exert a positive feeding force on the bare wire.

Other objects and features of this invention will become apparent from the following description.

In the drawings:

Fig. 1 is a front end elevation of the essential parts of the apparatus made according to this invention.

Fig. 2 is a section thru the vertical center line of the extrusion aperture, taken on line 2—2 of Fig. 1, and illustrates how the bare wire is guided thru the extrusion aperture and how the emerging wire-reinforced extruded tape is wrapped upon the mandrel.

Fig. 3 is a section on line 3—3 of Fig. 2 and shows the shape of the extrusion aperture.

Fig. 4 is a section on line 4—4 of Fig. 1 and shows the means for forming the bare wire into a helical coil loosely surrounding the axially moving mandrel.

Fig. 5 shows on a larger scale the hose structure, partly in longitudinal section.

Similar reference characters refer to similar parts throughout the several views.

Numeral 10 designates the extruder machine having an extrusion die 11 bolted or otherwise suitably fixed to the outlet end of the tapered head 12. Die 11 has an extrusion aperture 13 therein shaped in outline according to the desired sectional shape of the tape of plastic material to be formed thereby. Aperture 13, as here shown, is enlarged at its center 14 to provide a bead 15 in the extruded tape 16 in which the reinforcing wire is imbedded as hereinafter described.

A rotating and axially travelling mandrel 20 is mounted upon suitable drive rollers 22 and a series of suitable guide rollers 21 spaced along its length to move past the extrusion aperture 13. Preferably mandrel 20 passes as closely adjacent to the extrusion aperture 13 as is practical for purposes which will appear hereinafter. Preferably mandrel 20 is made in a series of separate lengths, for instance 12 ft. sections, which may be quickly joined together end to end or separated at the joints, so that in effect mandrel 20 can be made to move continuously past extrusion aperture 13 for any desired length of time simply by joining additional sections thereto without stopping its uniform movement.

The reinforcing wire 30 is fed thru suitable guides to a wire coiler 31 which bends the wire into a self-retaining helical form which loosely surrounds mandrel 20 from point 32 where the coil is first formed approximately to the point 33 (see Fig. 2) where the bare wire 30 is first sprung radially outwardly to be guided to the extrusion aperture 13. In the form of wire coiler 31 shown in the drawings the wire 30 is forced endwise against a suitably curved groove 35 in the stationary die 36 (see Fig. 4) which progressively bends wire 30 into a self-retaining helical form. Wire 30 is forced endwise by two pairs of opposed driven rollers 37 and 38 which grip the wire therebetween and force it upwardly between the stationary apertured guides 39 to the coiling die 36. If so desired, any other suitable and well-known form of wire coiler may be used instead of the wire coiler 31 illustrated in the drawings.

The bare wire helix, designated by numeral 50, is given a slightly larger diameter than mandrel 20 so that said helix 50 is only loosely guided by mandrel 20 and will not be positively driven thereby as said mandrel rotates and moves axially (to the right as viewed in Fig. 1). The separate turns of the bare wire helix 50 are thus prevented from becoming entangled while being loosely guided to a location closely adjacent the extrusion aperture 13. Beginning approximately at the point 33 (see Fig. 2) the wire 30 is progressively sprung radially outwardly from helix 50 and guided in a smooth curved path thru a portion of the compression chamber 53 in the extruder head 12 to the inlet of extrusion aperture 13. A stationary wire guide 51 having a curved duct 52 therein springs wire 30 outwardly and guides it in such a gradually curved path as will not destroy its coiled set to a point aligned with the center of enlargement 14 in extrusion aperture 13 and closely adjacent thereto. Preferably duct 52 is restricted in diameter at its outlet end 55 to fit closely around wire 30 as it emerges therefrom in order to minimize any tendency of the compressed plastic compound to enter duct 52.

The plastic compound is forced thru extension aperture 13 at high pressure in a well known manner. The embedded wire 30 is carried straight thru the relatively short aperture 13 by the force of the compressed compound adhering thereto. The emerging extruded tape 16 contains the wire 30 embedded in its central bead 15 (see Fig. 3). Now as soon as tape 16 is free to do so the embedded wire 30 causes it to inherently tend to again coil up into circular shape due to the urge of wire 30 to spring back into coiled shape. Thus tape 16 can be readily wrapped around mandrel 20 without wire 30 cutting thru the relatively soft and weak extruded material surrounding same. At the beginning of the operation of the apparatus the initially extruded end of tape 16 is fixed to the surface of the rotating mandrel 20 merely by being pressed into adherence thereto and preferably wrapped around said mandrel 20 one or several turns to more securely fasten tape 16 to the smooth mandrel 20 is coordinated with its rate of rotation to provide the desired pitch in the wrapped helix 60 of wire reinforced extruded tape 16. Fig. 5 shows how the successive turns of tape 16 overlap one another when tape 16 is wrapped upon mandrel 20. The peripheral speed of rotation of mandrel 20 is made equal to the speed at which tape 16 emerges from the extrusion aperture, so that tape 16 is uniformly wrapped upon the rotating mandrel 20 without mandrel 20 exerting any substantial tension on tape 16 such as would tend to straighten out the free gradually curving path of said tape from the extrusion aperture to the point where the tape first contacts mandrel 20. This free curved path is clearly shown in Fig. 2. Also from Fig. 2 it is clear that the curved path of wire 30 from the time it is sprung radially outward from the bare coil 50 to the time the wire-reinforced tape 16 is wrapped upon mandrel 20 is so smooth and gradual that the inherent urge of the wire to spring back to its coiled shape is not destroyed.

The apparatus, after having been started as described above, may obviously be run continuously to produce a continuous length of wrapped hose 60 so long as mandrel 20 is in effect kept in continuous length by adding additional sections to the end thereof, as described above. At the outlet end of the apparatus the wrapped hose 60 may be cut off into sections at the joint between two sections of mandrel 20 by any suitable automatic cutting means in a manner now well known in the art. The cut-off sections of hose 60 while still wrapped upon the corresponding sections of mandrel 20 may be then vulcanized or cured in any suitable well known manner. After vulcanization, the mandrel section may be removed from the hose section after first loosening the hose from the mandrel by progressively slightly twisting the yieldable hose in the direction which will tend to unwrap the wire reinforcement and cause it to spring outwardly from the mandrel and thereby increase the diameter of the wrapped hose sufficiently to break its slight bond to the mandrel. Preferably the mandrel is originally coated with a suitable soap or other solution to minimize the adherence of the vulcanized hose thereto.

Fig. 5 illustrates the structure of the wrapped hose 60. In the form shown, the extruded tape 16 is given an auxiliary edge bead 17 which has no reinforcing wire therein. In the wrapped hose 60 this bead 17 reinforces and strengthens the overlapping portions of tape 16 as clearly shown in Fig. 5. In the final vulcanized hose the helical beads 17 aid in retaining the hose walls in circular shape and in effect are auxiliary to the wire-reinforced beads 15 for this purpose, but do not interfere with the necessary distortion of the hose walls when the hose is suitably bent at any desired angle when located in its final installations.

While the embodiment of the present invention as herein disclosed, constitutes a preferred form, it is to be understood that other forms might be adopted.

What is claimed is as follows:

1. In a method for forming flexible tubing, the steps comprising: continuously forming a wire into a helix, advancing the helix axially from its forming station, passing a moving portion only of said helix through an extruding aperture from a plastic extruder, continuously extruding a tape of plastic materials through said aperture and around said helix, and then continuously wrapping the thus formed wire reinforced tape in overlapping turns for forming a tubular structure.

2. In a method for forming a flexible reinforced tubing, the steps comprising: continuously wrapping a wire in helical form around the mandrel while moving the mandrel axially thereof for forming a helix with the wire upon the mandrel, continuously enlarging at least one turn of said helix and passing said enlarged turn through a plastic extruder aperture, continuously extruding plastic tape material around said wire as the wire emerges from said aperture and continuously wrapping said wire reinforced tape in overlapping relation upon said mandrel for forming a tubular structure having a helical wire reinforcement therein.

3. In a method for forming a wire reinforced flexible tubing, the steps comprising: continuously forming a helix of reinforcing wire, progressively extruding plastic tape material onto a portion of said helix for forming a continuous length of material having a preformed wire therein and continuously overlapping said tape material with the wire embedded therein upon a mandrel to form a tube.

References Cited in the file of this patent

UNITED STATES PATENTS

| | | |
|---|---|---|
| 815,571 | Williams | Mar. 20, 1906 |
| 2,513,106 | Prendergast | June 27, 1950 |
| 2,516,864 | Gilmore et al. | Aug. 1, 1950 |
| 2,539,853 | Meyers et al. | Jan. 30, 1951 |
| 2,584,208 | Holmgren | Feb. 5, 1952 |
| 2,642,898 | Acock et al. | June 23, 1953 |